United States Patent
Caponetti et al.

(10) Patent No.: US 11,215,163 B2
(45) Date of Patent: Jan. 4, 2022

(54) POSITION BASED VIBRATION REDUCTION OF NACELLE MOVEMENT OF WIND TURBINE

(71) Applicant: VESTAS WIND SYSTEMS A/S, Aarhus N (DK)

(72) Inventors: Fabio Caponetti, Åbyhøj (DK); Jesper Sandberg Thomsen, Hadsten (DK); Poul Brandt Christensen, Ry (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 101 days.

(21) Appl. No.: 16/614,839

(22) PCT Filed: May 15, 2018

(86) PCT No.: PCT/DK2018/050104
§ 371 (c)(1),
(2) Date: Nov. 19, 2019

(87) PCT Pub. No.: WO2018/210390
PCT Pub. Date: Nov. 22, 2018

(65) Prior Publication Data
US 2020/0158084 A1  May 21, 2020

(30) Foreign Application Priority Data
May 19, 2017  (DK) .............................. PA201770358

(51) Int. Cl.
*F03D 7/02* (2006.01)
*F03D 9/25* (2016.01)
(Continued)

(52) U.S. Cl.
CPC ......... *F03D 7/0296* (2013.01); *F03D 7/0224* (2013.01); *F03D 9/25* (2016.05); *F03D 13/35* (2016.05); *F03D 7/04* (2013.01)

(58) Field of Classification Search
CPC .......... F03D 7/0296; F03D 9/25; F03D 13/35; F03D 7/0224; F03D 7/04
See application file for complete search history.

(56) References Cited

U.S. PATENT DOCUMENTS

| | | | |
|---|---|---|---|
| 2006/0066111 A1 | 3/2006 | Suryanarayanan et al. | |
| 2013/0230396 A1 | 9/2013 | Wakasa et al. | |
| 2020/0263666 A1* | 8/2020 | Pedersen | F03D 7/0224 |

FOREIGN PATENT DOCUMENTS

| | | |
|---|---|---|
| CN | 1906409 A | 1/2007 |
| CN | 103321854 A | 9/2013 |

(Continued)

OTHER PUBLICATIONS

Chinese Office Action for Application No. 201880033030.9 dated Jul. 28, 2020.

(Continued)

*Primary Examiner* — Viet P Nguyen
(74) *Attorney, Agent, or Firm* — Patterson + Sheridan, LLP (57) ABSTRACT

The present invention relates to control of a wind turbine where nacelle vibration is reduced by use of blade pitching or generator torque modulation. The nacelle vibrations are reduced based on a position signal of the nacelle. An actuator signal is determined based on the position signal and applied to the actuator capable of reducing nacelle vibration. The actuator signal is gain adjusted based on a separation between the rotor frequency and tower vibration frequency.

20 Claims, 5 Drawing Sheets

(51) Int. Cl.
*F03D 13/35* (2016.01)
*F03D 7/04* (2006.01)

(56) References Cited

FOREIGN PATENT DOCUMENTS

| | | |
|---|---|---|
| CN | 105874196 A | 8/2016 |
| DK | 201170731 A | 12/2012 |
| DK | 201470481 A1 | 8/2015 |
| EP | 2112376 A2 | 10/2009 |
| EP | 2963283 A1 | 1/2016 |
| JP | 4076123 B2 | 4/2008 |
| WO | 2010060772 A2 | 6/2010 |
| WO | 2016128004 A1 | 8/2016 |
| WO | 2018210390 A1 | 11/2018 |

OTHER PUBLICATIONS

Danish Patent, and Trademark Office 1st Technicai Examiation of Application No. PA 2017 703558 dated Nov. 17, 2017.
PCT International Search Report for Application No. PCT/DK2018/050104 dated Jun. 8, 2018.
PCT Written Opinion of the International Searching Authority for application No. PCT/DK2018/050104.

\* cited by examiner

POSITION BASED VIBRATION REDUCTION OF NACELLE MOVEMENT OF WIND TURBINE

FIELD OF THE INVENTION

The present invention relates to control of a wind turbine to reduce nacelle vibration.

BACKGROUND OF THE INVENTION

Wind turbines as known in the art comprises a wind turbine tower supporting a nacelle and a rotor with a number of pitch-adjustable rotor blades.

A wind turbine is prone to vibrations since it comprises a large mass placed at the end of a slender tower. These vibrations include nacelle movement in the lateral direction, in the fore-aft direction as well as in the torsional direction of the nacelle. It is known in the art that the vibrations can be damped by actively pitching of the blades and/or adjusting the generator torque to generate counter forces to reduce the nacelle movement.

In this regard, a collective adjustment of the blade pitch, where all rotor blades are adjusted by the same pitch angle, can be used to counteract oscillations in the fore-aft direction. This is accomplished by modifying the thrust force. For lateral vibrations, an individual blade pitch adjustment as well as generator torque adjustments may be used to counteract a lateral vibration of the tower. The individual blade pitch adjustment provides individual pitch angle settings for each rotor blade to generate a resulting lateral force, and/or to suppress an existing disturbance from e.g. a pitch misalignment. The generator torque adjustment generates a generator torque induced lateral force.

In US2010289266 a wind turbine is described which is arranged to adjust the rotor blade pitch angle for each rotor blade independently depending on the lateral vibration of the tower, such that the amplitude of the lateral vibration of the tower is damped. The pitch adjustment is based on a measured acceleration of the nacelle and an evaluation unit arranged to determine a pitch amplitude based on the tower acceleration.

It is against this background that the invention has been devised.

SUMMARY OF THE INVENTION

It would be advantageous to achieve improved means for reducing vibration of a nacelle. In this regard, it would be advantageous to provide improved means for reducing the vibration of the nacelle movement in the lateral direction and/or in the torsional direction.

In control of wind turbines to reduce vibrations of the nacelle, the control law may be based on an emulation of the wind turbine system as a viscous damper (spring-mass system) where the displacement of the nacelle in the form of an object with a given mass is governed by a second order differential motion equation, including a damping coefficient and a stiffness coefficient (spring constant). For such a system it is different to control it via the velocity as the input signal and the position as the input signal, since these two parameters work through different terms in the motion equation, i.e. through the damping term or the stiffness term.

The inventors of the present invention have realized that the parameters governing the movement of the mass may be influenced to provide improved operation in connection with vibration reduction.

In a first aspect of the present invention, there is provided a method of controlling a wind turbine, the wind turbine comprising a tower structure supporting a nacelle and a rotor with a number of pitch-adjustable rotor blades, the rotor being arranged to drive an electrical generator, the method comprises:

obtain a position signal indicative of a position of the nacelle in a direction of a movement of the nacelle;

determine a first signal based on the position signal, the first signal being determined to reduce nacelle vibration in the direction of the movement of the nacelle;

determine a tower vibration frequency of a tower vibration eigenmode;

determine an excitation frequency affecting the tower structure; determine an adjustment gain, the adjustment gain having an operational sign defined by a separation between the excitation frequency and the tower vibration frequency, and apply the adjustment gain to the first signal; and determine an actuator signal based on the gain adjusted first signal, and apply the actuator signal to an actuator of the wind turbine capable of reducing nacelle vibration in the direction of the movement of the nacelle.

By basing the actuator signal of the actuator capable of reducing the nacelle vibration on the position of the nacelle, the effective stiffness of the wind turbine tower is influenced, and a stabilization of the nacelle movement can be obtained. Undesired vibration of the nacelle movement can thereby be reduced in a simple, yet robust, control strategy. By applying the gain adjustment to the signal indicative of a position of the nacelle, so that the operational sign of the adjustment gain is defined by the separation between the excitation frequency and the tower vibration frequency, the tower frequency can effectively be pushed away from the tower vibration frequency of a tower vibration eigenmode. This will increase the distance between the excitation frequency and the eigenfrequency of the tower vibration which has a beneficial effect on the tower vibration movement.

The adjustment gain is applied to the first signal. The adjustment gain may be based on an adjustment gain function where the absolute value is symmetric around the tower vibration frequency and with different operational signs on each side of the tower vibration frequency. Thus the adjustment gain function on one side of the tower vibration frequency is equal to the adjustment gain function on other side of the tower vibration frequency, except for the operational sign. While the absolute value of the adjustment gain function may be symmetric around the tower vibration frequency, it need not be in all embodiments.

In embodiments where the adjustment gain is an adjustment gain function, the adjustment gain function may comprise an adjustment zone around the tower vibration defining an adjustment gain function as a function of the separation between the excitation frequency and the tower vibration frequency, and zero or negligible outside the adjustment zone. The adjustment zone may comprise a positive zone where the adjustment gain function is positive on one side of the tower vibration frequency, and a negative zone where the adjustment gain function is negative on other side of the tower vibration frequency. At the value of the tower vibration frequency, the adjustment gain function may take either the positive value or the negative value of the adjustment gain function.

The adjustment gain function may be a continuous function inside the adjustment zone, except at the tower vibration frequency where it may jump from the positive value to the negative value (or vice versa).

The absolute value of the adjustment gain function may be an increasing function starting with a small value for a large separation between the excitation frequency and tower vibration frequency and a large value for a small separation between the excitation frequency and tower vibration frequency, with maximal absolute value at the tower vibration frequency.

The adjustment gain function may be defined in accordance with any function with a functional dependency upon the rotor speed which express that the operational sign of the adjustment gain is determined by a separation between the excitation frequency and tower vibration frequency.

In an embodiment the excitation frequency is the rotor frequency, and in general the excitation frequency is a selected positive integer, n, times the rotor frequency. Thus the excitation frequency may be a so-called 1P, 2P, 3P, etc.

One advantage of the embodiments of the present invention is that it is made possible to reduce vibrations for systems where the excitation frequency is close an eigenfrequency mode, irrespectively of whether the excitation frequency is lower than the eigenfrequency or higher than the eigenfrequency.

The direction of the movement of the nacelle is advantageously the lateral direction or the torsional direction of the nacelle movement. In this regard, the tower vibration eigenmode is the eigenmode relevant for the vibration. The eigenmode may be an eigenmode for the lateral vibration or an eigenmode for the torsional vibration. In this regard, the eigenmode selected for determining the adjustment gain may be the eigenmode comprising the largest vibrational energy, typically the first eigenmode of the relevant vibration, however it may also be other eigenmodes. In particular, it may be an eigenmode which is selected based on the separation with the excitation frequency, such as the eigenmode closest in frequency to the excitation frequency.

In embodiments, the separation between the excitation frequency and the tower vibration frequency may be based on a difference between the excitation frequency and the tower vibration frequency or on a ratio between the excitation frequency and the tower vibration frequency. In this regard, the separation is preferably a separation in frequency, and the separation may be based on the separation between the excitation frequency and the vibrational eigenmode which is selected for damping.

In an embodiment, also a velocity signal indicative of a velocity of a movement of the nacelle in the direction of the movement of the nacelle may be obtained, and based on the velocity signal a second signal to reduce nacelle vibration may be determined. The adjustment gain being applied to the second signal, and then the gain adjusted second signal is applied to the actuator of the wind turbine capable of reducing nacelle vibration in the lateral direction of the movement of the nacelle.

By applying a velocity signal in addition to the position signal in order to reduce the vibration both the damping term and the stiffness term of the emulated viscous damper system may be targeted, which may result in an improved vibration reduction control.

In embodiments, the actuator of the wind turbine capable of reducing nacelle vibration in the direction of the movement of the nacelle may be the pitch adjustable rotor blades or the power reference. In connection with the pitch-adjustable rotor blades, a resulting pitch signal may be applied to the pitch-adjustable rotor blades individually, each individual blade being based on a combined signal of the collective pitch reference and the first signal, or a combined signal of the collective pitch reference and the first signal and the second signal.

In connection with using the a resulting power reference signal to the electrical generator as an actuator for the vibration reduction, a resulting power reference may be based on a combined signal of the power reference and the first signal, or a combined signal of the power reference and the first signal and the second signal.

Both the collective pitch reference for the pitch-adjustable rotor blades and the power reference for the electrical generator may be determined based on a rotor speed. In an advantageous setup, the collective pitch reference or power reference are determined by feedback control based on minimizing a speed error between an actual rotor speed and a reference rotor speed. An advantage with this embodiment is that it integrates well with the common control strategy of error minimization, e.g. in connection with PID, PI or similar control schemes.

The position of the nacelle (and optionally the velocity) is in general determined from a position signal indicative of the nacelle position, and may therefore be obtained by measurements which are not directly of the nacelle position as such. The nacelle position may be determined by or from a tower top position measurement, a rotor hub position measurement, or other suitable measurements. In an embodiment, the determination is based on a measured acceleration signal indicative of the nacelle movement, e.g. obtained from an accelerometer positioned in the nacelle or at the tower top. Generally, the position signal (and optionally the velocity) may be obtained by other suitable means arranged to output a signal indicative of the nacelle position (and velocity), including but not limited to: a GPS signal, an inclinometer, an inertial measuring unit (IMU), a Kalman filter.

In an embodiment where the position signal is based on an accelerometer positioned to measure an acceleration signal of the nacelle in the direction of the movement of the nacelle, the position signal may be obtained by applying in series a first integration of the acceleration signal to obtain an estimated velocity signal and a second integration of the velocity signal to obtain the position signal. The estimated velocity signal may advantageously be used as the velocity signal indicative of a velocity of a movement of the tower top as the estimated velocity signal.

Accelerometers are often placed in the nacelle and/or tower top of wind turbines, and by use of this signal vibration reduction may be obtained by using equipment which is already in place or may easily be provided. In this setup, the first signal and/or the second signal may advantageously be determined as the estimated position multiplied with a first gain and/or as the estimated velocity multiplied with a second gain. The gains may be determined based on standard methods to tune control loops. In an embodiment which is implemented to base the actuation only on the position signal, this may be obtained by setting the second gain to zero.

Advantageously, the estimated position signal is high-pass filtered prior to determining the first signal. By high-pass filtering the estimated position, it can be ensured that only vibrations around the specific operating point is damped. When basing the vibration reduction on a position feedback, the controller will force the position to a reference position. By applying a high-pass filter to the position signal the vibration is reduced with respect to the current operating point of the nacelle without the need to define a reference position.

In an embodiment, the adjustment gain is further determined based on a functional dependency upon the rotor speed. The functional dependency may expressed in any manner which ensures that the gain is positive for rotor frequencies which are lower than the vibrational eigenmode, and negative for rotor frequencies which are higher than the vibrational eigenmode.

The adjustment gain may further be gain scheduled by a gain scheduling term being dependent upon an operational point of the wind turbine. That is the total gain may be adjusted for such operational parameters as wind speed, amplitude of acceleration, rotor speed, or other parameters defining an operational point.

In an embodiment, the actuator of the wind turbine capable of reducing nacelle vibration in the lateral direction of the movement of the nacelle is one or both of:
  a power reference adjustment arranged to vary a counter torque of the generator over time in dependence on the lateral vibration to provide a generator torque induced force that reduces the lateral vibration, and
  a blade pitch angle adjustment for each pitch adjustable blade to provide a lateral force that counteract the lateral vibration.

The actuator capable of reducing nacelle vibration in the torsional direction of the movement of the nacelle is a blade pitch angle adjustment for each pitch adjustable blade to provide a torsional force that counteract the torsional vibration.

In an embodiment where the actuation of the wind turbine capable of reducing nacelle vibration is a blade pitch angle adjustment for each pitch adjustable blade, the actuator signal may be transformed from a signal representing a desired force or torque in the direction of the movement of the nacelle to a resulting pitch contribution for each of the pitch-adjustable rotor blades. The signal need not as such be a force or torque signal, but should represent or otherwise reflect an amplitude of a signal suitable for reducing vibration of the nacelle. The transformation is to obtain resulting pitch contributions for each of the pitch-adjustable rotor blades. The transformation may be based on a multi-blade coordinate transformation of the Coleman transformation or Fourier coordinate transformation type, which is arranged to take a signal in a non-rotating reference frame and transform it to a resulting signal in the rotating frame. Thus the transformation is arranged to transform the actuator signal representing a desired force or torque in the direction of the movement of the nacelle in a non-rotating reference frame to a resulting pitch contribution for each of the pitch-adjustable rotor blades in the rotating frame.

In further aspects there are provided a computer program product comprising software code adapted to control a wind turbine in accordance with the first aspect when executed on a data processing system.

Further aspects also include a control system for a wind turbine with proper hardware equipment, including input and output modules for handling control signals and processing modules for implementing the method of the first aspect. Moreover, a wind turbine is provided which comprises the control system.

The computer program product may be provided on a computer readable storage medium or being downloadable from a communication network. The computer program product comprise instructions to cause a data processing system, e.g. in the form of a controller, to carry out the instruction when loaded onto the data processing system.

In general, a controller may be a unit or collection of functional units which comprises one or more processors, input/output interface(s) and a memory capable of storing instructions that can be executed by a processor.

In general the various aspects of the invention may be combined and coupled in any way possible within the scope of the invention. These and other aspects, features and/or advantages of the invention will be apparent from and elucidated with reference to the embodiments described hereinafter.

BRIEF DESCRIPTION OF THE DRAWINGS

Embodiments of the invention will be described, by way of example only, with reference to the drawings, in which FIG. 1 illustrates a wind turbine (FIG. 1A) together with a schematic view of lateral vibrational movement (FIG. 1B) and a torsional vibrational movement (FIG. 1C);

DESCRIPTION OF EMBODIMENTS

Figure 1A:
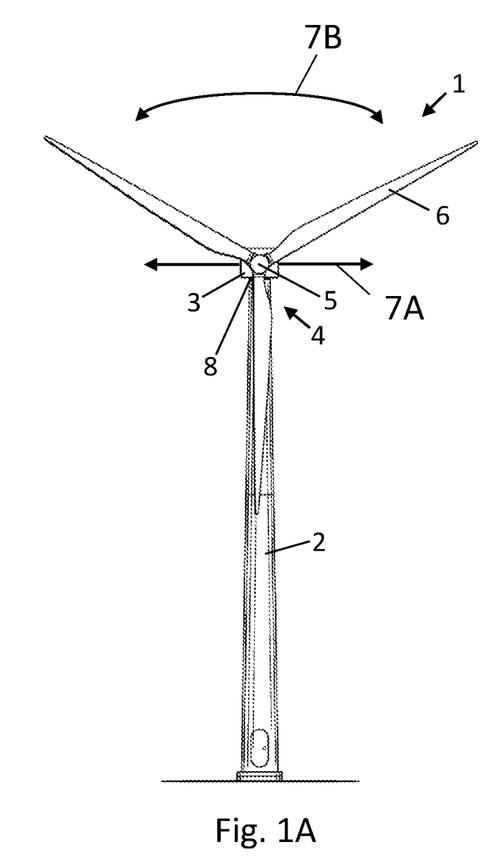

FIG. 1A illustrates, in a schematic perspective view, an example of a wind turbine 1. The wind turbine 1 includes a tower 2, a nacelle 3 disposed at the apex of the tower, and a rotor 4 operatively coupled to a generator housed inside the nacelle 3. In addition to the generator, the nacelle houses miscellaneous components required for converting wind energy into electrical energy and various components needed to operate, control, and optimize the performance of the wind turbine 1. The rotor 4 of wind turbine includes a central hub 5 and a plurality of blades 6 that project outwardly from the central hub 5. In the illustrated embodiment, the rotor 4 includes three blades 6, but the number may vary. Moreover, the wind turbine comprises a control system. The control system may be placed inside the nacelle or distributed at a number of locations inside (or externally to) the turbine and communicatively connected. The rotor blades are pitch-adjustable. The rotor blades can be adjusted in accordance with a collective pitch setting, where each of the blades are set to the same pitch value. In addition to that, the rotor blades are adjustable in accordance with individual pitch settings, where each blade may be provided with an individual pitch setting.

Figure 1B:
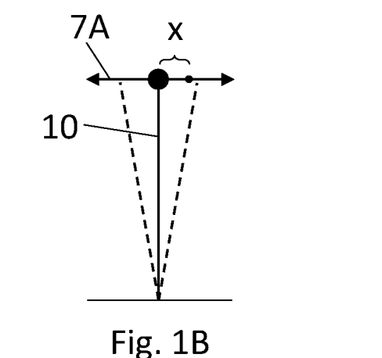
Figure 1C:
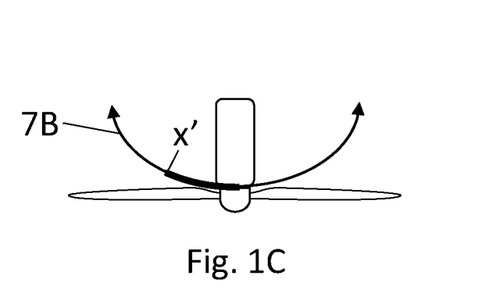

The turbine may vibrate in the lateral direction 7A, that is in a direction of the rotor plane. Such vibration is also sometimes referred to as side-side vibration. Aspects of lateral vibration is schematically illustrated in FIG. 1B. In this figure, the turbine 10 is schematically illustrated by a tower structure fixed in one end and provided with a mass at the free end. When the tower top vibrates in the lateral direction 7A, the position, x, characteristic of the nacelle position, varies between two maxima defined by the maximum tower deflection during the vibration. The position, x, may be a position representative of the nacelle position in a direction defined by the lateral movement. The position may, e.g., be a centre-of-mass position of the nacelle, the position of the relevant sensor, or position of other fix-points representing the movement of the nacelle in the lateral direction. In addition to the lateral vibration, also torsional vibration along the torsional direction 7B is illustrated in FIG. 1C. In this regard torsional direction should be understood as movement along a path defined by an arc sector or circle sector as shown. When the tower top vibrates in the torsional direction 7B, the position, x', characteristic of the nacelle position in the torsional direction, varies between two maxima defined by the maximum tower twist during the vibration. In an embodiment using an accelerometer 8 or gyroscope 8 to determine the nacelle movement, the accelerometer/gyroscope should be properly placed, such as at one end of the nacelle. In this regard, it may not be necessary to directly detecting the movement along the torsional direction, instead also indirect detection of the movement may be used, as long as the indirect movement correlates with the torsional movement. This may e.g. be obtained by an accelerometer which detects movement in the lateral direction, in combination with further information to determine that the movement is related to torsional vibration. Such further information may be the frequency of the vibration.

In a general embodiment of the present invention vibrational movement is reduced by the following general steps: Obtain a position signal indicative of a position of the nacelle in the relevant movement, i.e. determine x (or x'). Based on the position signal determining a signal for damping the nacelle movement, and finally applying the signal to an actuator capable of reducing the vibration.

Figure 2:
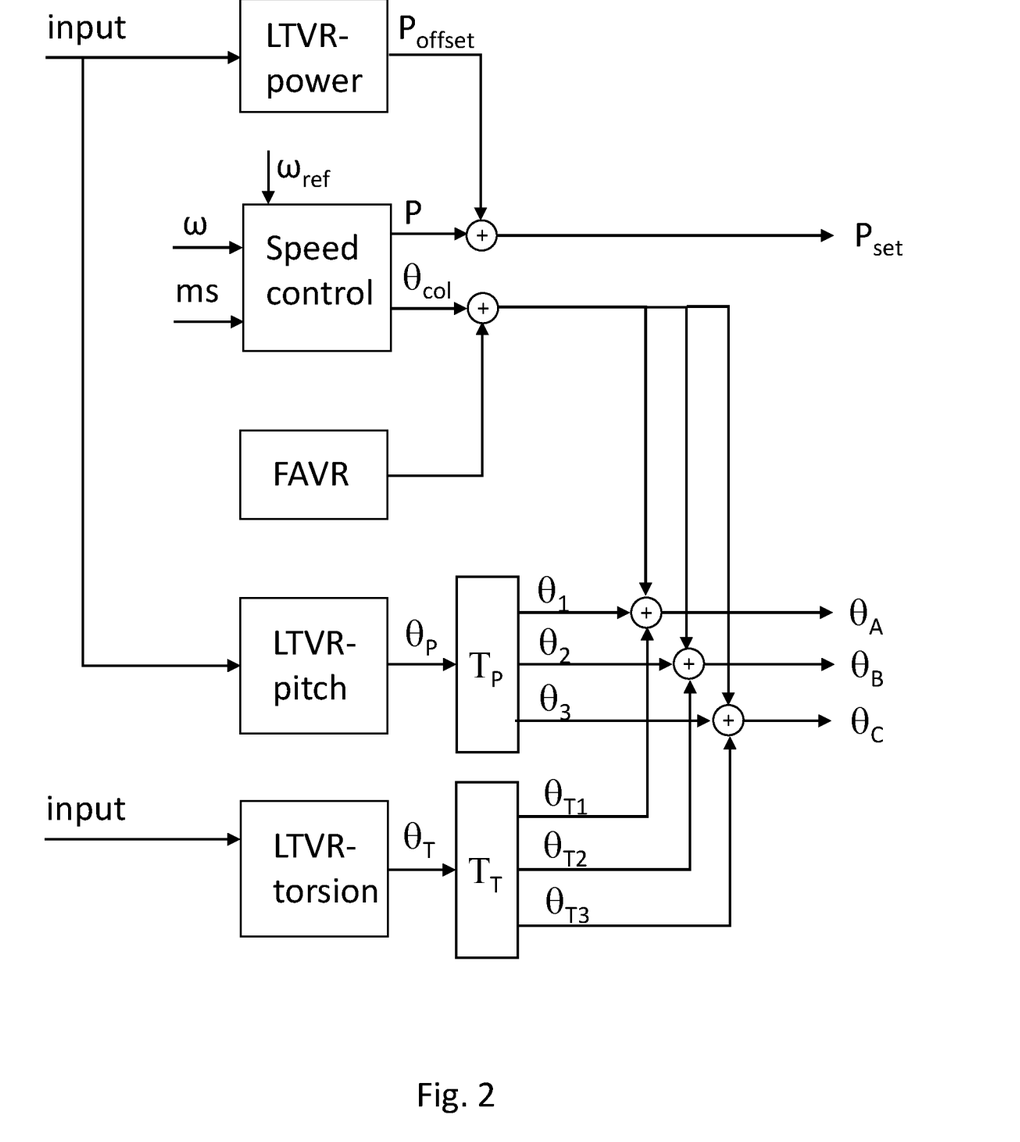
FIG. 2 illustrates a general control scheme for an embodiment.

FIG. 2 is a diagram schematically illustrating this general embodiment in the context of a feedback speed controller. In one implementation, the speed controller minimizes a speed error ($\omega$-$\omega_{ref}$) between the actual generator speed, $\omega$, and a reference speed, $\omega_{ref}$, in order to output a requested power P and a collective pitch reference, $\theta_{col}$. The feedback speed controller may be implemented by a PI, PID or similar control schemes.

FIG. 2 further illustrates a number of vibration reducing control blocks.

Figure 3:
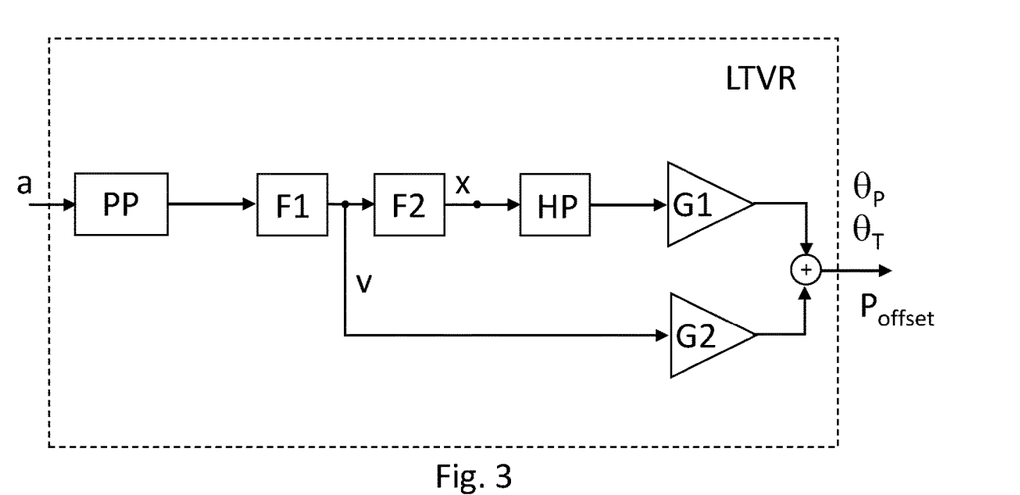
FIG. 3 illustrates a general embodiment of a lateral tower vibration reduction block.

A block is illustrated which shows the lateral tower vibration reduction by using the pitch (LTVR-pitch), where pitch actuation signals for reducing lateral tower vibrations is being determined based on the first signal and optionally the second signal. Embodiments of the first and second signals are illustrated in FIG. 3.

The LTVR-pitch control block determines an actuator signal $\theta_P$ which is transformed in a transformation unit $T_P$ to pitch reference offsets ($\theta_1$, $\theta_2$, $\theta_3$) for each of the blades so that resulting pitch signals ($\theta_A$, $\theta_B$, $\theta_C$) can be applied to the pitch-adjustable rotor blades individually. Each individual blade actuation signal being based on the actuator signal $\theta_P$, and thereby on a combined signal of the collective pitch reference $\theta_{col}$ and the first signal, or a combined signal of the collective pitch reference and the first signal and the second signal as determined by the LTVR-pitch block.

The LTVR-pitch block determines a signal representing a desired force or torque in the direction of the movement of the nacelle. The transformation is to obtain resulting pitch contributions ($\theta_1$, $\theta_2$, $\theta_3$) for each of the pitch-adjustable rotor blades.

The transformation, $T_P$, may be based on a multi-blade coordinate transformation of the Coleman transformation or Fourier coordinate transformation type, which is arranged to take a signal in a non-rotating reference frame ($\theta_P$) and transform it to a resulting signal in the rotating frame ($\theta_1$, $\theta_2$, $\theta_3$).

As an addition or as an alternative, the lateral tower vibration may also be reduced by using the power as actuator (LTVR-power), where a power actuation signal for reducing lateral tower vibrations by use of the power reference is being determined based on the first signal and optionally the second signal.

The LTVR-power control block determine a power reference offset ($P_{offset}$) to be combined with the power reference P to provide a resulting power reference ($P_{set}$). The resulting power reference is being determined based on a combined signal of the power reference and the actuator signal $P_{offset}$, and thereby on the first signal, or a combined signal of the power reference and the first signal and the second signal. The resulting power reference signal is applied to the electrical generator. Embodiments of the first and second signals are illustrated in FIG. 3.

As an addition or as an alternative, also the torsional tower vibration may also be reduced by using the pitch as actuator (LTVR-torsion), where pitch actuation signals for reducing torsion tower vibrations is being determined based on the first signal and optionally the second signal.

The LTVR-torsion control block determines an actuator signal $\theta_T$ which is transformed in a transformation unit $T_P$ to pitch reference offsets ($\theta_{T1}$, $\theta_{T2}$, $\theta_{T3}$) for each of the blades so that resulting pitch signals ($\theta_A$, $\theta_B$, $\theta_C$) can be applied to the pitch-adjustable rotor blades individually. Each individual blade actuation signal being based on the actuator signal $\theta_P$, and thereby on a combined signal of the collective pitch reference $\theta_{col}$ and the first signal, or a combined signal of the collective pitch reference and the first signal and the second signal as determined by the LTVR-torsion block. Embodiments of the first and second signals are illustrated in FIG. 3.

The LTVR-torsion block corresponds to the LTVR block, and the transformation, $T_T$, is similar to the transformation $T_P$, expect that the specific implementation is made for torsional movement.

Moreover, vibration reduction in the fore-aft direction may also be target by imposing a vibration reduction pitch offset signal onto the collective pitch reference $\theta_{col}$. This pitch offset signal may be determined in a fore-aft vibration reduction block (FAVR), to provide a reduction of the vibration, or damping of the nacelle movement, in the fore-aft direction.

The collective pitch reference is determined by the speed controller in view of the rotor speed and possibly also further sensor values, referred to in FIG. 2 as a measurement set, ms.

FIG. 3 illustrates a general embodiment of a lateral tower vibration reduction block. In this regard it is understood that the tower vibration reduction blocks relating to power, pitch and torsion as illustrated in FIG. 2 could all be implemented according to this general scheme. However, the specific implementation would differ for the different actuation types. In particular the various filters and gains would be adapted to the specific actuation block or actuation type.

FIG. 3 illustrates an embodiment of the LTVR blocks of FIG. 2, where a measured accelerometer signal, a, is used as input, and obtained by an accelerometer positioned so that the acceleration of the movement in the relevant direction of the nacelle is measured, cf. ref. 8 on FIG. 1.

The acceleration signal may in general be used as a raw signal, however typically the signal is pre-processed PP to a certain extend. Such pre-processing may be the application of an anti-aliasing filter to remove any high frequency content which is not needed for the further use. Other filters, including other band-pass filter may be applied during the pre-processing.

The acceleration signal (or pre-processed version of it) is further processed by applying a series of filters to the signal. In the illustrated embodiment, an estimated position signal, x (or x'), indicative of a position of the tower top in the relevant direction is obtained by applying in series a first integration (F1) of the acceleration signal to obtain an estimated velocity signal, v (or v'), and a second integration (F2) of the velocity signal to obtain the position signal, x (or x'). In general any suitable filters which integrate the input signal can be applied. In an embodiment, the first and second integrations may be implemented as leaky integrators. The leaky integrators can be implemented as 1st order low pass filters tuned with a break frequency below the 1st fore-aft mode frequency, the frequency being the system frequency comprising the tower, rotor, nacelle, and optionally also foundation.

The first signal to the actuator capable of reducing the nacelle vibration in the relevant direction (pitch or power) may be determined as the estimated position, x, multiplied with a first gain G1.

In an embodiment, the speed signal indicative of a speed of a movement of the tower top in the relevant direction may be obtained as the estimated velocity signal v, which results after the first integration F1.

The second signal may be determined as the estimated velocity, v, multiplied with a second gain G2.

In this embodiment, the resulting signal is sum of the first (position) and second (velocity) signals. As described, the invention may in an embodiment be implemented by basing the first signal only. In such an embodiment, this may be obtained by setting the gain G2 to zero.

In a further embodiment, also illustrated in FIG. 3, the position signal is high-pass filtered (HP) prior to determining the first signal.

A general advantage of the embodiment described in connection with FIGS. 2 and 3 is that position and velocity measurements or estimates do not have to have correct absolute values, as long as the signals correlate with the real values in the frequency area of interest.

Figure 4:
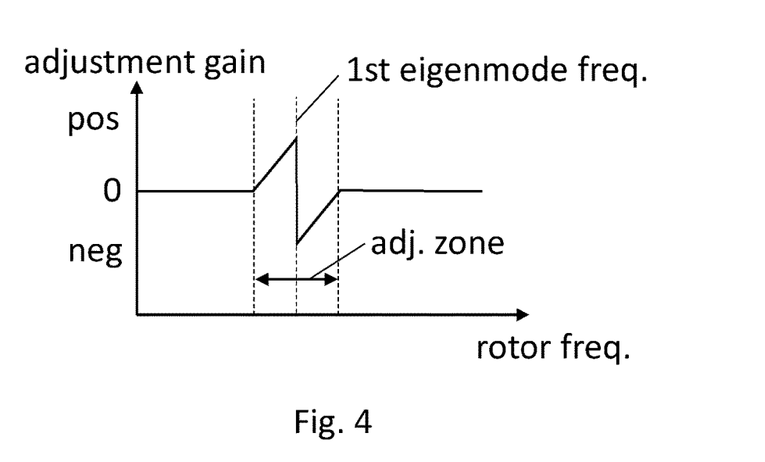
FIG. 4 illustrates an example of the adjustment gain in dependency upon the rotor frequency.

FIG. 4 illustrates an example of the adjustment gain in dependency upon the rotor frequency. That is for a situation where the excitation frequency is the rotor frequency. Thus for a situation where the excitation is imposed by the rotating rotor.

The adjustment gain is applied to the first signal and optionally the second signal, in order to gain adjust the first signal, and optionally the second signal, prior to applying the signals to the actuator of the wind turbine capable of reducing nacelle vibration in the direction of the movement of the nacelle.

In this regard, the tower vibration frequency of a tower vibration eigenmode is determined and a rotor frequency corresponding to the rotor speed is determined. Based on these values, the adjustment gain is determined so that the operational sign of it is defined by a separation between the rotor frequency and tower vibration frequency.

In this regard, the actuation signal $S_{act}$ may be expressed as:

$$S_{act} = g_{adj}(g_1 \cdot x_{est} + g_2 \cdot V_{est})$$

In the embodiment illustrated in FIG. 4 the adjustment gain is set to be 0 for rotor frequencies outside an adjustment zone and increasing positive for rotor frequencies approaching the $1^{st}$ eigenmode from lower frequencies, and increasing negative for rotor frequencies approaching the $1^{st}$ eigenmode from higher frequencies.

In FIG. 4, the adjustment gain function is illustrated as a piecewise linear function, however, this function may be defined in accordance with any function with a functional dependency upon the rotor speed which express that the operational sign of the adjustment gain is determined by a separation between the excitation frequency and tower vibration frequency.

In embodiments, the separation between the excitation frequency and tower vibration frequency is based on a difference between the excitation frequency and tower vibration frequency or on a ratio between the excitation frequency and tower vibration frequency.

In an embodiment, the actuation signal $S_{act}$ may further be gain scheduled by including into the adjustment gain a gain scheduling term being dependent upon an operational point of the wind turbine. For example, the gain adjustment term may be multiplied by a factor which increases with increasing acceleration in the lateral direction.

Figure 5:
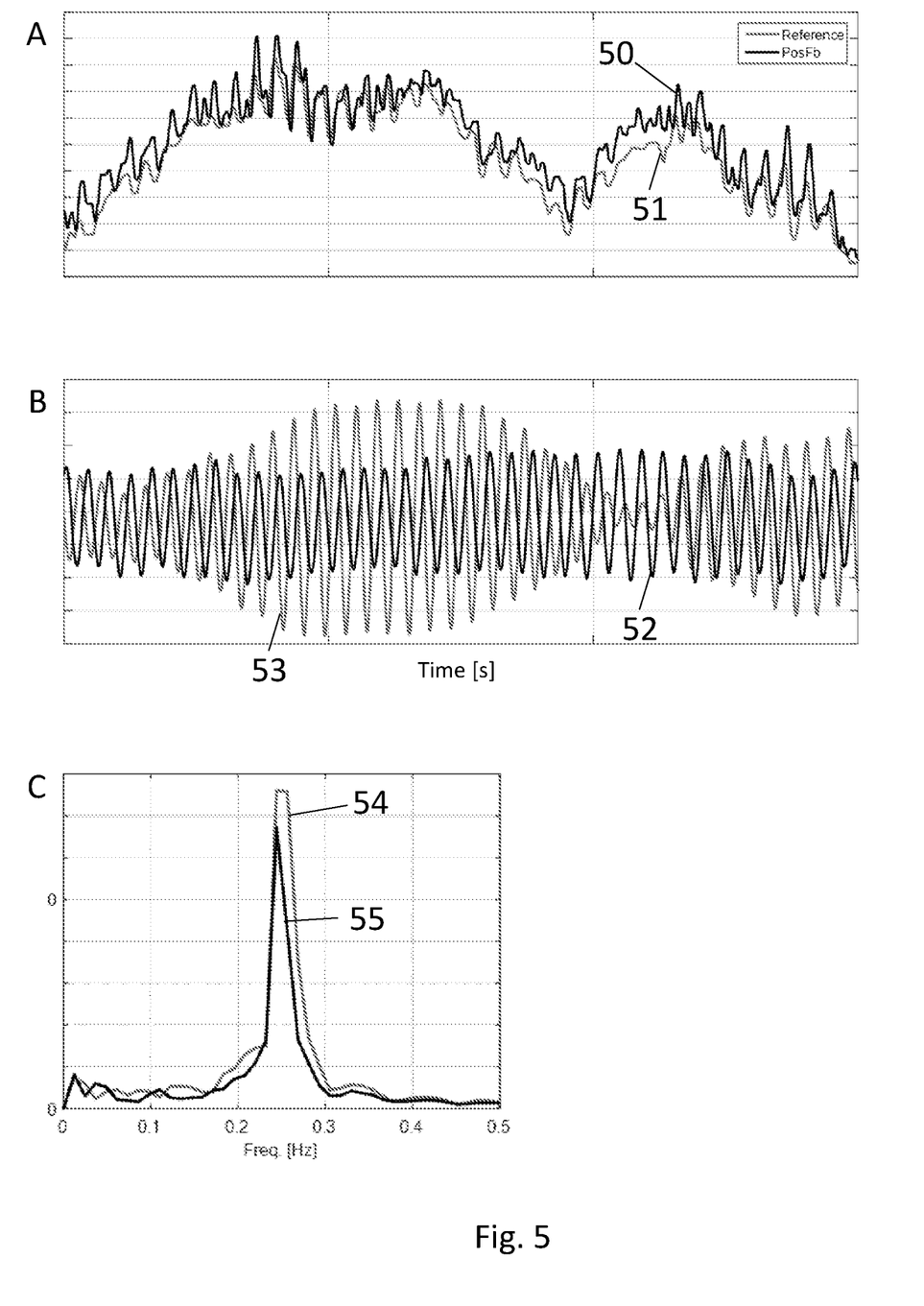
FIG. 5 and FIG. 6 illustrate example plots.

FIG. 5 illustrates example plots in the form of time traces obtained by the method as defined in FIG. 3 compared to same situation without application of the method. The plots are based on a simulation of a wind turbine system.

FIG. 5A illustrates an example pitch settings for a reference situation 51 compared to the corresponding pitch settings 50 for a situation where lateral vibrations are reduced based on embodiments of the present invention. The plot illustrates the blade pitch angle in degrees, the plot referred to as 50 corresponds e.g. to $\theta_1$.

FIG. 5B illustrates the resulting tower top lateral position for the reference situation 53 and the situation where lateral vibration reduction is applied 51. As can be seen directly, the tower top vibration amplitude has been reduced.

The simulations are done for a situation where the rotor frequency is coinciding with the first eigenmode of the lateral vibration. FIG. 5C illustrates a fast Fourier transformation (FFT) of the two signals of FIG. 5B. Thus the figure shows the FFT plots for the reference situation 54 and for the situation based on embodiments of the present invention 55.

As can be seen, the tower frequency is pushed away from the tower vibration frequency, thereby increasing the distance between the rotor frequency and the eigenfrequency.

Figure 6:
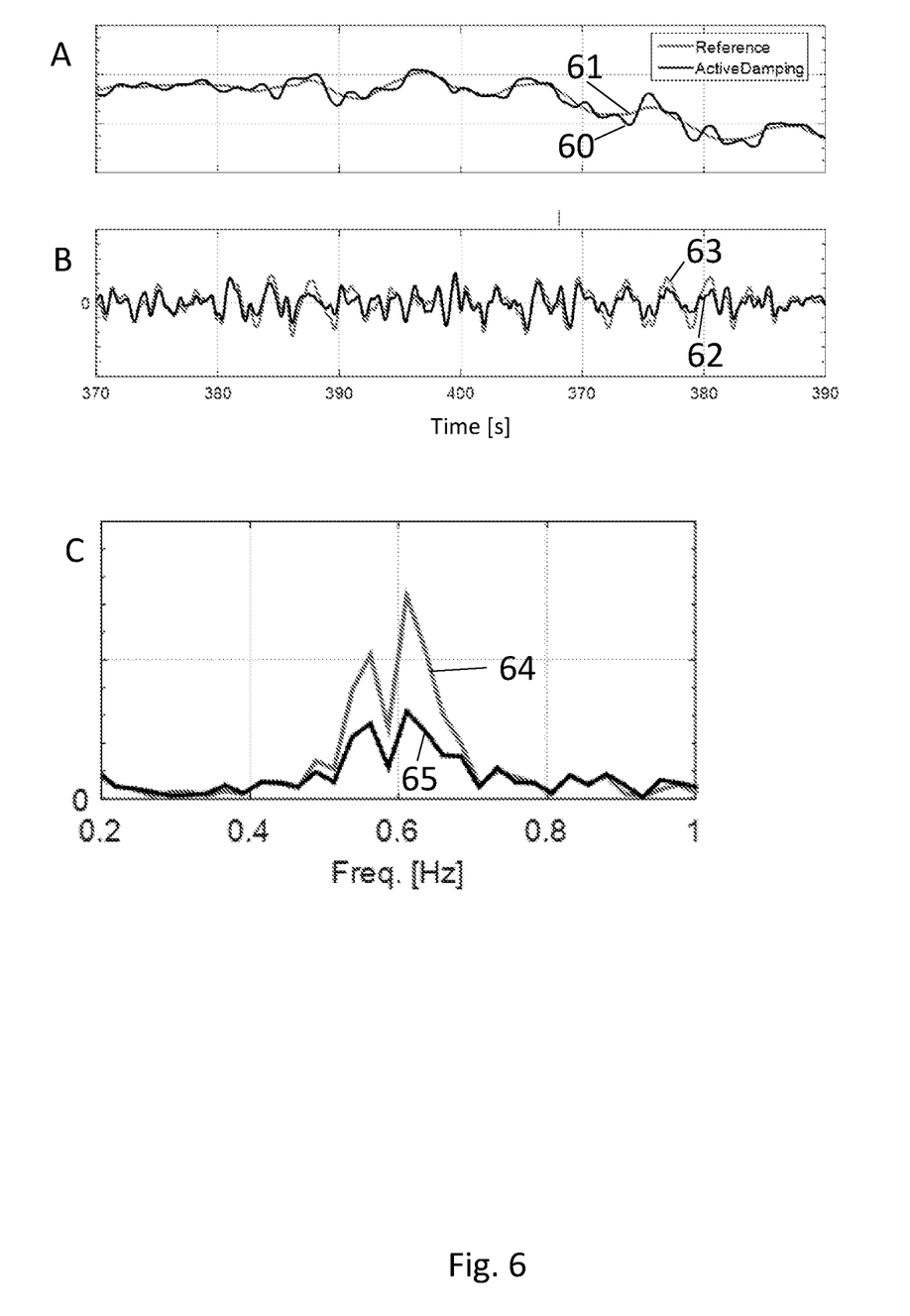

FIG. 6 illustrates example plots in the form of time traces obtained by the method as defined in FIG. 3 compared to same situation without application of the method. The plots are based on a simulation of a wind turbine system.

FIG. 6A illustrates an example pitch settings for a reference situation 61 compared to the corresponding pitch settings 60 for a situation where torsional vibrations are reduced based on embodiments of the present invention. The plot illustrates the blade pitch angle in degrees, the plot referred to as 60 corresponds e.g. to $\theta_{T1}$.

FIG. 6B illustrates the resulting nacelle yaw speed which is a measure for the torsional vibration for the reference situation 63 and the situation where torsional vibration reduction is applied 62. As can be seen directly, the tower top vibration amplitude has been reduced.

FIG. 6C illustrates a fast Fourier transformation (FFT) of the two signals of FIG. 6B. Thus the figure shows the FFT plots for the reference situation 64 and for the situation based on embodiments of the present invention 65.

As can be seen, the peak at the observed frequency has been reduced which show that a reduction in the torsional vibrational has been achieved.

Although the present invention has been described in connection with the specified embodiments, it should not be construed as being in any way limited to the presented examples. The invention can be implemented by any suitable means; and the scope of the present invention is to be interpreted in the light of the accompanying claim set. Any reference signs in the claims should not be construed as limiting the scope.

The invention claimed is:

1. A method of controlling a wind turbine comprising a tower structure supporting a nacelle and a rotor with a number of pitch-adjustable rotor blades, the rotor being arranged to drive an electrical generator, the method comprising:
    obtaining a position signal indicative of a position of the nacelle in a direction of a movement of the nacelle;
    determining, based on the position signal, a first signal configured to reduce nacelle vibration in the direction of the movement of the nacelle;
    determining a tower vibration frequency of a tower vibration eigenmode;
    determining an excitation frequency affecting the tower structure;
    determining an adjustment gain having an operational sign based on a difference, or on a ratio, between the excitation frequency and the tower vibration frequency;
    applying the adjustment gain to the first signal;
    determining an actuator signal based on the gain-adjusted first signal; and
    applying the actuator signal to an actuator of the wind turbine capable of reducing the nacelle vibration.

2. The method according to claim 1, further comprising:
    obtaining a velocity signal indicative of a velocity of a movement of the nacelle in the direction of the movement of the nacelle;
    determining, based on the velocity signal, a second signal configured to reduce the nacelle vibration; and
    applying the adjustment gain to the second signal,
    wherein determining the actuator signal is further based on the pain-adjusted second signal.

3. The method according to claim 2, further comprising:
    obtaining, using an accelerometer of the wind turbine, an acceleration signal in the direction of the movement of the nacelle,
    wherein obtaining the velocity signal comprises:
        applying an integration of the acceleration signal to obtain an estimated velocity signal indicative of a velocity of a movement of a tower top.

4. The method according to claim 3, wherein the second signal is determined as the estimated velocity signal multiplied with a second gain.

5. The method according to claim 1, further comprising:
    determining, based on a rotor speed, a collective pitch reference for the pitch-adjustable rotor blades; and
    applying, to each of the pitch-adjustable rotor blades individually, a resulting pitch signal that is based on a combined signal of the collective pitch reference and the actuator signal.

6. The method according to claim 1, further comprising:
    transforming the actuator signal from a signal representing a desired force or torque in the direction of the movement of the nacelle to a resulting pitch contribution for each of the pitch-adjustable rotor blades.

7. The method according to claim 1, further comprising:
    determining, based on a rotor speed, a power reference for the electrical generator; and
    applying, to the electrical generator, a resulting power reference signal that is based on a combined signal of the power reference and the actuator signal.

8. The method according to claim 1, further comprising:
    determining, using feedback control based on minimizing a speed error between an actual rotor speed and a reference rotor speed, one of a collective pitch reference for the pitch-adjustable rotor blades or a power reference for the electrical generator.

9. The method according to claim 1, further comprising:
    obtaining, using an accelerometer of the wind turbine, an acceleration signal in the direction of the movement of the nacelle,
    wherein obtaining the position signal comprises:
        applying a first integration of the acceleration signal to obtain an estimated velocity signal; and
        applying a second integration of the estimated velocity signal to obtain an estimated position signal indicative of a position of a tower top in the direction of the movement of the nacelle.

10. The method according to claim 9, wherein the first signal is determined as the estimated position signal multiplied with a first gain.

11. The method according to claim 1, wherein the position signal is high-pass filtered prior to determining the first signal.

12. The method according to claim 1, wherein the excitation frequency is a selected positive integer times a rotor frequency.

13. The method according to claim 1, wherein the direction of the movement of the nacelle is a lateral direction or a torsional direction.

14. The method according to claim 1, wherein determining the adjustment gain is further based on a function having a functional dependency upon a rotor speed.

15. The method according to claim 1, wherein the adjustment gain further comprises a gain scheduling term that is dependent upon an operational point of the wind turbine.

16. The method according to claim 1, wherein the actuator of the wind turbine is capable of reducing the nacelle vibration in a lateral direction of the movement of the nacelle, wherein the actuator signal is one or both of:
    a power reference adjustment configured to vary, in dependence on a lateral vibration, a counter torque of the electrical generator over time to provide a generator torque-induced force that reduces the lateral vibration, and
    a blade pitch angle adjustment for each of the pitch-adjustable rotor blades to provide a lateral force that counteracts the lateral vibration.

17. A computer program product stored on a non-transitory medium and comprising software code adapted to perform an operation for controlling a wind turbine when executed on a data processing system, the wind turbine comprising a tower structure supporting a nacelle and a rotor with a number of pitch-adjustable rotor blades, the rotor being arranged to drive an electrical generator, the operation comprising:
    obtaining a position signal indicative of a position of the nacelle in a direction of a movement of the nacelle;
    determining, based on the position signal, a first signal configured to reduce nacelle vibration in the direction of the movement of the nacelle;
    determining a tower vibration frequency of a tower vibration eigenmode;
    determining an excitation frequency affecting the tower structure;
    determining an adjustment gain having an operational sign based on a difference, or on a ratio, between the excitation frequency and the tower vibration frequency;
    applying the adjustment gain to the first signal;

determining an actuator signal based on the gain-adjusted first signal; and applying the actuator signal to an actuator of the wind turbine capable of reducing the nacelle vibration.

18. A control system for a wind turbine comprising a tower structure supporting a nacelle and a rotor with a number of pitch-adjustable rotor blades, the rotor being arranged to drive an electrical generator, the control system comprising:

an input module configured to obtain a position signal indicative of a position of the nacelle in a direction of a movement of the nacelle;

a processing module configured to:
determine, based on the position signal, a first signal configured to reduce nacelle vibration in the direction of the movement of the nacelle;
determine a tower vibration frequency of a tower vibration eigenmode;
determine an excitation frequency affecting the tower structure;
determine an adjustment gain having an operational sign based on a difference, or on a ratio, between the excitation frequency and the tower vibration frequency;
apply the adjustment gain to the first signal; and
determine an actuator signal based on the gain-adjusted first signal; and an actuator system configured to apply the actuator signal to an actuator of the wind turbine capable of reducing the nacelle vibration.

19. The control system of claim 18, wherein the direction of the movement of the nacelle is a lateral direction or a torsional direction.

20. A wind turbine comprising:

a tower structure supporting a nacelle;

a rotor with a number of pitch-adjustable rotor blades, the rotor operatively coupled to an electrical generator housed inside the nacelle; and a control system configured to:
obtain a position signal indicative of a position of the nacelle in a direction of a movement of the nacelle;
determine, based on the position signal, a first signal configured to reduce nacelle vibration in the direction of the movement of the nacelle;
determine a tower vibration frequency of a tower vibration eigenmode;
determine an excitation frequency affecting the tower structure;
determine an adjustment gain having an operational sign based on a difference, or on a ratio, between the excitation frequency and tower vibration frequency;
apply the adjustment gain to the first signal; and
determine an actuator signal based on the gain-adjusted first signal; and
apply the actuator signal to an actuator of the wind turbine capable of reducing the nacelle vibration.

* * * * *